(12) United States Patent
Ducaule et al.

(10) Patent No.: US 7,937,415 B2
(45) Date of Patent: May 3, 2011

(54) APPARATUS AND METHOD FOR STRIPPING BUSINESS INTELLIGENCE DOCUMENTS OF REFERENCES TO UNUSED DATA OBJECTS

(75) Inventors: Sébastien Ducaule, Levallois-Perret (FR); Stéphane Lecercle, Herblay (FR); Benoit Maury, Pierrefitte sur Seine (FR)

(73) Assignee: Business Objects, S.A., Levallois-Perret (FR)

( * ) Notice: Subject to any disclaimer, the term of this patent is extended or adjusted under 35 U.S.C. 154(b) by 418 days.

(21) Appl. No.: 11/966,476

(22) Filed: Dec. 28, 2007

(65) Prior Publication Data
US 2009/0172006 A1 Jul. 2, 2009

(51) Int. Cl.
*G06F 17/00* (2006.01)
(52) U.S. Cl. ......................................... 707/803; 707/804
(58) Field of Classification Search .................. 707/803, 707/804, 706, 707
See application file for complete search history.

(56) References Cited

U.S. PATENT DOCUMENTS
2003/0069765 A1* 4/2003 Menninger ........................ 705/7
2007/0219964 A1* 9/2007 Cannon et al. .................... 707/3

OTHER PUBLICATIONS

Cui, et al., Lineage tracnig for general data warehouse transformations. Proc. 27th VLDB Conf., Rome, Italy (2001).
Zhang, et al., Cost effective forward data lineage tracing. Department of Computer Science, Purdue University West Lafayette, IN (Mar. 2007).
Stephen et al., "Using Automated Fix Generation to Secure SQL Statements". Int'l Conf. Software Engineering—Proc. 3rd International Workshop on Software Engineering for Secure Systems, IEEE Computer Society, Washington, DC (2007).
Gennady et al. "Query processing and Optimization in Oracle Rdb" The VLDB Journal—The International Journal on Very Large Data Bases, vol. 5, pp. 229-237 (1996).

* cited by examiner

*Primary Examiner* — Sana Al-Hashemi
(74) *Attorney, Agent, or Firm* — Mintz, Levin, Cohn, Ferris, Glovsky and Popeo, P.C.

(57) ABSTRACT

A computer readable storage medium comprises executable instructions to provide a first report defining a plurality of references to a plurality of data objects. The plurality of references to the plurality of data objects is analyzed to identify references to unused data objects. The references to the unused data objects are removed from the plurality of references to generate a subset of references to a subset of data objects. A second report defining the subset of references to the subset of data objects is generated.

25 Claims, 7 Drawing Sheets

US 7,937,415 B2

APPARATUS AND METHOD FOR STRIPPING BUSINESS INTELLIGENCE DOCUMENTS OF REFERENCES TO UNUSED DATA OBJECTS

BRIEF DESCRIPTION OF THE INVENTION

This invention relates generally to document stripping. More particularly, this invention relates to techniques for stripping Business Intelligence documents of unused data object references to reduce the documents' size and simplify data computations.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate work lows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

In many organizations, data is stored in multiple formats and data sources that are not readily compatible. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports and any other data source accessible through an established protocol, such as, Open DataBase Connectivity ("ODBC") and the like. Data sources may also include a data source where the data is not stored like data streams, broadcast data, and the like. Data sources are comprised of values and objects, such as dimensions, columns, rows, attributes, measures and the like, otherwise referred to as data model objects.

Because of the complexities of organizational data and their underlying data sources, it is advantageous to work with data within a semantic context. This can be accomplished by using a level of semantic abstraction that provides terms and abstract logic associated with the underlying data in order to manage, manipulate and analyze the data. A semantic layer or domain is the term for a level of abstraction based on a relational, OLAP, or other data source or a combination of more than one data sources or existing semantic layers. The semantic layer includes data model objects that describe the underlying data sources and define dimensions, attributes and measures that can be applied to the underlying data sources. The semantic layer may also include data foundation metadata that describes a connection to, structure for, and aspects of the underlying data sources.

A semantic layer can be used as a level of abstraction to combine partial data sets from any number of original data sources. A semantic layer can also be used to provide logical sets to which data can be associated so that data from a wide number of sources can be meaningfully aggregated. Metadata concerning the data, such as a value for data freshness, can also be associated with the data within the logic of a semantic domain. Semantic domain technology is disclosed in the following commonly-owned U.S. Pat. Nos. 5,555,403; 6,247,008; 6,578,027; and 7,181,435, which are incorporated herein by reference.

Typically, a data model object is assigned a common business term such that the user does not need to understand the specific logic of the underlying data source but can work with familiar terminology when constructing queries or otherwise accessing the data. Examples of common business terms include customer, employee, product line, revenue, profit, attrition, fiscal year, quarter, and the like.

For example, organizational data for a retail institution may be distributed among an OLTP database for storing sales transactions, a relational database for storing data pertaining to customers, an OLAP database for storing financial data according to geographical regions, time period, and products, and various spreadsheets storing sales performance figures for each member of the sales team. The data may be stored as various data objects spread among the different data sources, for example, the OLTP data source may store data objects such as "quantities sold" and "products sold," the relational database may store data objects such as "customer names" and "customer addresses," and the OLAP database may store data objects such as "revenues per region," "revenues per quarter," and so on. Retrieving data for analysis may therefore require multiple queries to multiple data sources.

There are a number of commercially available tools that can retrieve data from multiple data sources automatically. These tools can also integrate the data into a single "report" to facilitate analysis of the retrieved data. For example, Business Objects™ of San Jose, Calif., sells a number of widely used report generation tools, including Crystal Reports™, Business Objects Of AP Intelligence™, Business Objects Voyager™, Business Objects Web Intelligence™, and Business Objects Enterprise™.

As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

Reports may be large because of the amount of data retrieved and the number of computations required for presenting the data to a user. Using the retail institution example above, consider a regional manager trying to access sales performance for a given region. The regional manager may have to periodically generate a report with sales revenue for various stores within the region. The report may list customer information, sales associate information, store information, region information, and quantities sold for various products and brands, and the like.

In presenting the information to the regional manager, the report must include references to various data objects and their associated queries, filters, presentation formats, and so on. If the regional manager desires to generate a report listing only a subset of these data objects, for example, listing only store information, region information, and sales revenue per region, references to the other data objects may still be included in the report unnecessarily. These unused references increase the size and complexity of the report. Managing the reporting needs of a business organization can therefore be unnecessarily more time consuming and computationally intensive than actually required.

Accordingly, it would be desirable to provide techniques to remove unnecessary data object references from reports. In particular, it would be desirable to provide techniques that reduce the size of reports, the complexity of data computations, and the amount of data retrieved from different data sources by stripping unused references and unused data objects from the reports.

SUMMARY OF THE INVENTION

The invention includes a computer readable storage medium with executable instructions to provide a first report defining a plurality of references to a plurality of data objects. The plurality of references to the plurality of data objects is analyzed to identify references to unused data objects. The references to unused data objects are removed from the plurality of references to generate a subset of references to a subset of data objects. A second report defining the subset of references to the subset of data objects is generated.

The invention also includes a computer readable medium with executable instructions to trace a data lineage of a plurality of data objects associated with a first report. The data lineage is analyzed to identify unused data objects in the plurality of data objects. The unused data objects are removed from the plurality of data objects to generate a subset of data objects. A second report defining a subset of references to the subset of data objects is generated.

The invention further includes a method for stripping a document of references to unused data objects. A first report defining a plurality of references to a plurality of data objects is provided. The plurality of references to the plurality of data objects are analyzed to determine a first subset of references to a first subset of data objects, the first subset of data objects comprising unused data objects. A second report defining a second subset of references to a second subset of data objects is generated, the second subset of data objects comprising the plurality of data objects minus the unused data objects.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The present invention provides a system, method, software arrangement, and computer readable storage medium for stripping Business Intelligence documents such as reports of references to unused data objects. As generally used herein, a data object describes underlying data sources and defines dimensions, attributes and measures within a semantic layer that can be applied to the underlying data sources. The underlying data sources may include any sources of data enabling data storage and retrieval, for example, databases, files, and the like.

According to an embodiment of the invention, a report includes references to data objects. The references may include queries, formulas, aggregations, functions, and operators, among others. The references may also include references to unused data objects, i.e., data objects that are not used or retrieved to generate results for the report. These references unnecessarily increase the size and complexity of the report.

According to an embodiment of the invention, a report having references to unused data objects is stripped to generate a second report with these references removed. In one embodiment, references to unused data objects are identified by tracing a data lineage for the data objects referenced in the report. As generally used herein, a data lineage maps the data objects to their origin and processing history. The backward lineage of any metadata associated with the data objects in the report is also traced to identify the unused data objects.

In one embodiment, only the data objects that are retrieved to generate results for the first report are referenced in the second report. Memory resources allocated by the unused data objects are freed up, thereby reducing the size and complexity of the second report.

Figure 1:
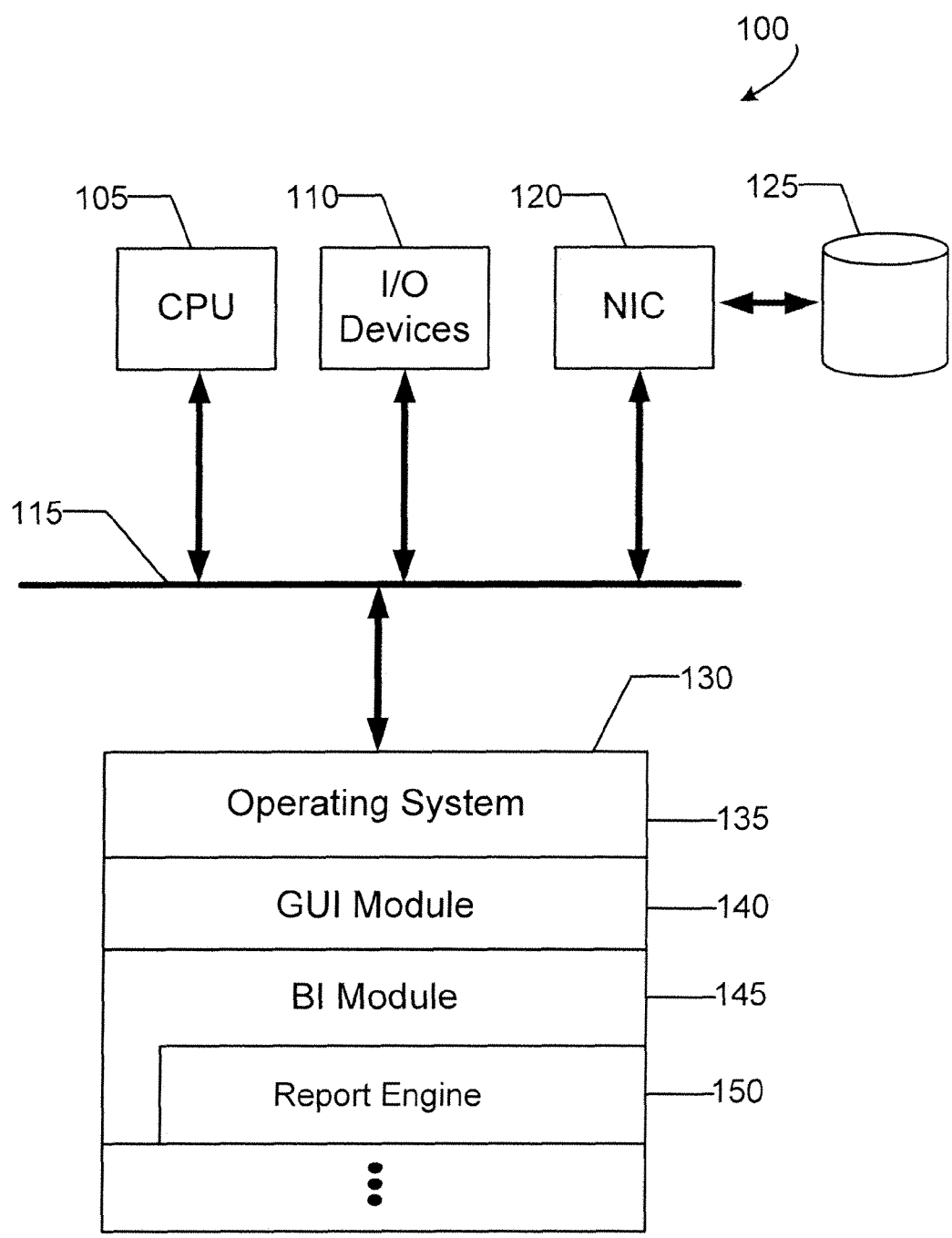
FIG. 1 illustrates a computer constructed in accordance with an embodiment of the invention.

FIG. 1 illustrates a computer configured in accordance with an embodiment of the invention. Computer 100 includes standard components, including a Central Processing Unit ("CPU") 105 and input/output devices 110, which are linked by a bus 115. Input output devices 110 may include a keyboard, mouse, touch screen, monitor, printer, and the like.

Network Interface Circuit ("NIC") 120 may also be connected to the bus 115. NIC 120 provides connectivity to a network (not shown), thereby allowing computer 100 to operate in a networked environment. For example, networked data sources 125 are connected to computer 100 through NIC 120. In accordance with the present invention, networked data sources 125 may include any number and type of data sources, such as, for example, OLAP, OLTP and relational databases, among others.

Memory 130 is also connected to the bus 115. In one exemplary embodiment, memory 130 stores one or more of the following modules: an operating system module 135, a Graphical User Interface ("GUI") module 140, and a Business Intelligence ("BI") module 145.

Operating system module 135 may include instructions for handling various system services, such as file services or for performing hardware dependant tasks. The GLI module 140 may rely upon standard techniques to produce graphical components of a user interface, e.g., windows, icons, buttons, menu and the like, for accessing and managing data in networked data sources 125.

BI module 145 includes executable instructions to perform BI-related functions, such as, performing abstract queries and analyses, accessing data sources such as relational and/or multidimensional databases, accessing document storage repositories, and the like. The BI module 145 can include the Report Engine 150, as a sub-module. The Report Engine 150 includes executable instructions for generating reports.

According to an embodiment of the invention, Report Engine 150 also includes executable instructions for identifying references to unused data objects in a report. In one embodiment, the unused data objects are identified by tracing a data lineage for the data objects referenced in the report. References to unused data objects are removed from the references in the report to generate a subset of references. Memory resources allocated for the unused data objects are also freed up.

The subset of references only references and retrieves a subset of data objects, i.e., those data objects that are used to generate results for the report. A new report defining the subset of references to the subset of data objects is generated. This new report is smaller and less complex than the original report, albeit generating the same results as the original report.

It is appreciated that the executable modules stored in memory 130 are exemplary. It is also appreciated that the functions of the modules may be combined. In addition, the functions of the modules need not be performed on a single machine. Instead, the functions may be distributed across a network, if desired. Indeed, the invention may be commonly implemented in a client-server environment with various components being implemented at the client-side and/or the server-side. As understood by those of ordinary skill in the art, it is the functions of the invention that are significant, not where they are performed or the specific manner in which they are performed.

Figure 2:
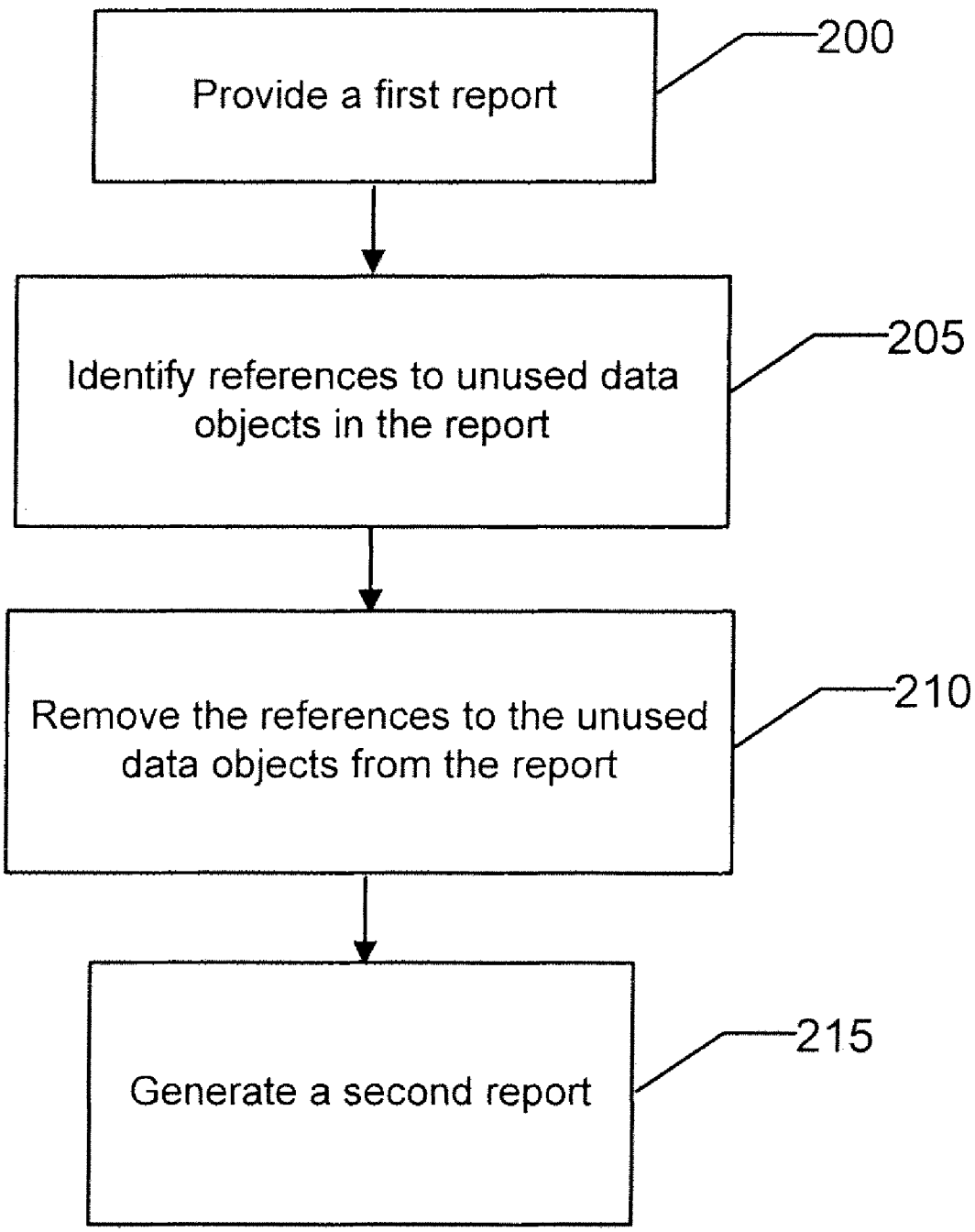
FIG. 2 illustrates a flow chart for stripping documents of references to unused data objects in accordance with an embodiment of the invention.

Referring now to FIG. 2, a flow chart for stripping documents of references to unused data objects in accordance with an embodiment of the invention is described. The operations of FIG. 2 may be implemented using the Report Engine 150 either independently or in conjunction with GUI module 140. Initially, Report Engine 150 provides a first report defining references to data objects (200). The references to the data objects are analyzed to identify references to unused data objects (205).

In one embodiment, the unused data objects are identified by tracing a data lineage of the data objects in the first report and by tracing a backward lineage of the metadata associated with the data objects. As generally used herein, a data lineage maps the data objects to their origin and processing history. The data lineage shows when the data objects are updated, how they are computed and where they are retrieved from.

The references to the unused data objects are removed from the references in the first report to generate a subset of references to a subset of data objects (210). In doing so, any memory resources allocated for the unused data objects are freed up. For example, queries to unused data objects are removed or rewritten to retrieve only the subset of data objects, i.e., those data objects that are used to generate results for the first report. The subset of data objects therefore includes the data objects referenced in the first report minus the unused data objects.

Lastly, a second report defining the subset of references to the subset of data objects is generated (215). This second report generates the same results as the first report but without including unnecessary references to unused data objects. The second report is thus smaller and less complex than the first report.

Figure 3:
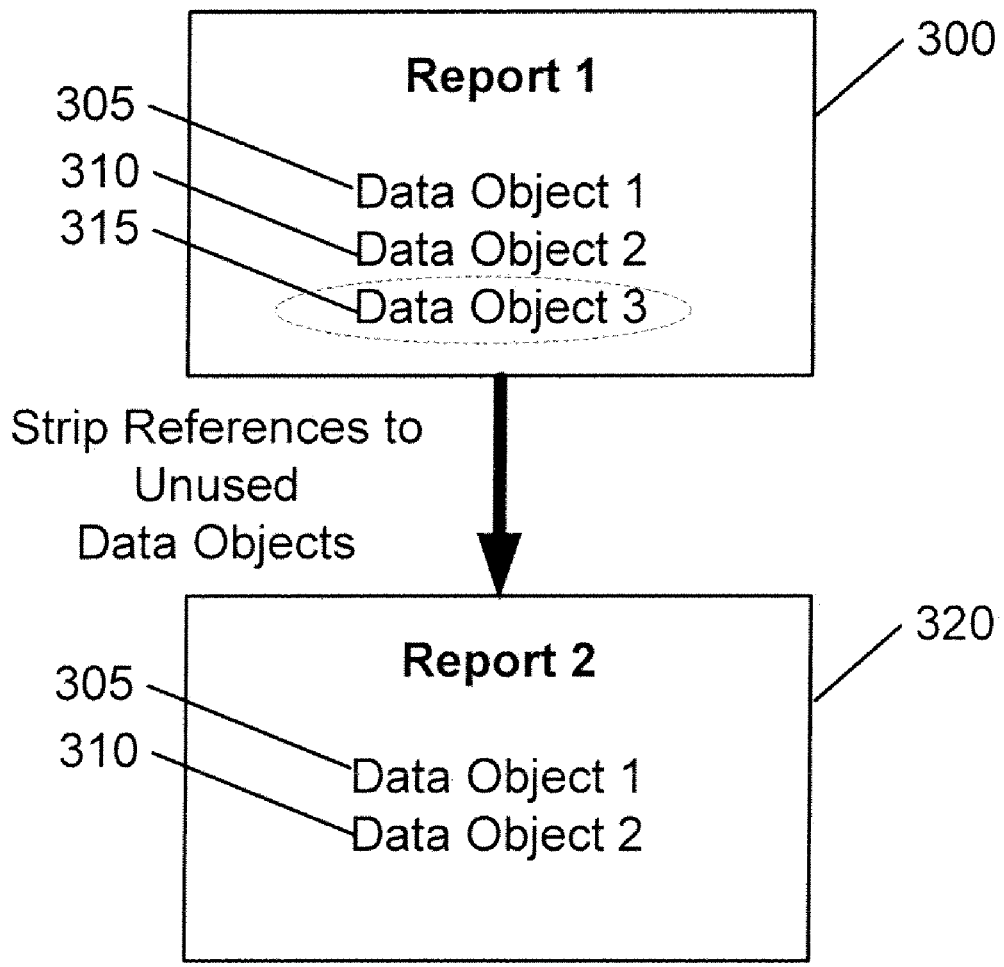
FIG. 3 illustrates a schematic diagram of an exemplary first report including a reference to an unused data object and an exemplary second report with the reference to the unused data object removed according to an embodiment of the invention.

Referring now to FIG. 3, a schematic diagram of an exemplary first report including a reference to an unused data object and an exemplary second report with the reference to the unused data object removed according to an embodiment of the invention is described. Report 300 includes references to data objects 305-315. Report Engine 150 traces the data lineage of data objects 305-315 to determine that data object 315 is not used to retrieve results for report 300.

Any references to data object 315 in report 300 are removed to generate a subset of references that only retrieves data objects 305 and 310. A new report 320 is generated defining this subset of references. Report 320 generates the same results as report 300 without the additional expense of having unnecessary references to unused data objects. That is, report 320 is smaller and less complex than report 300.

Figure 4:
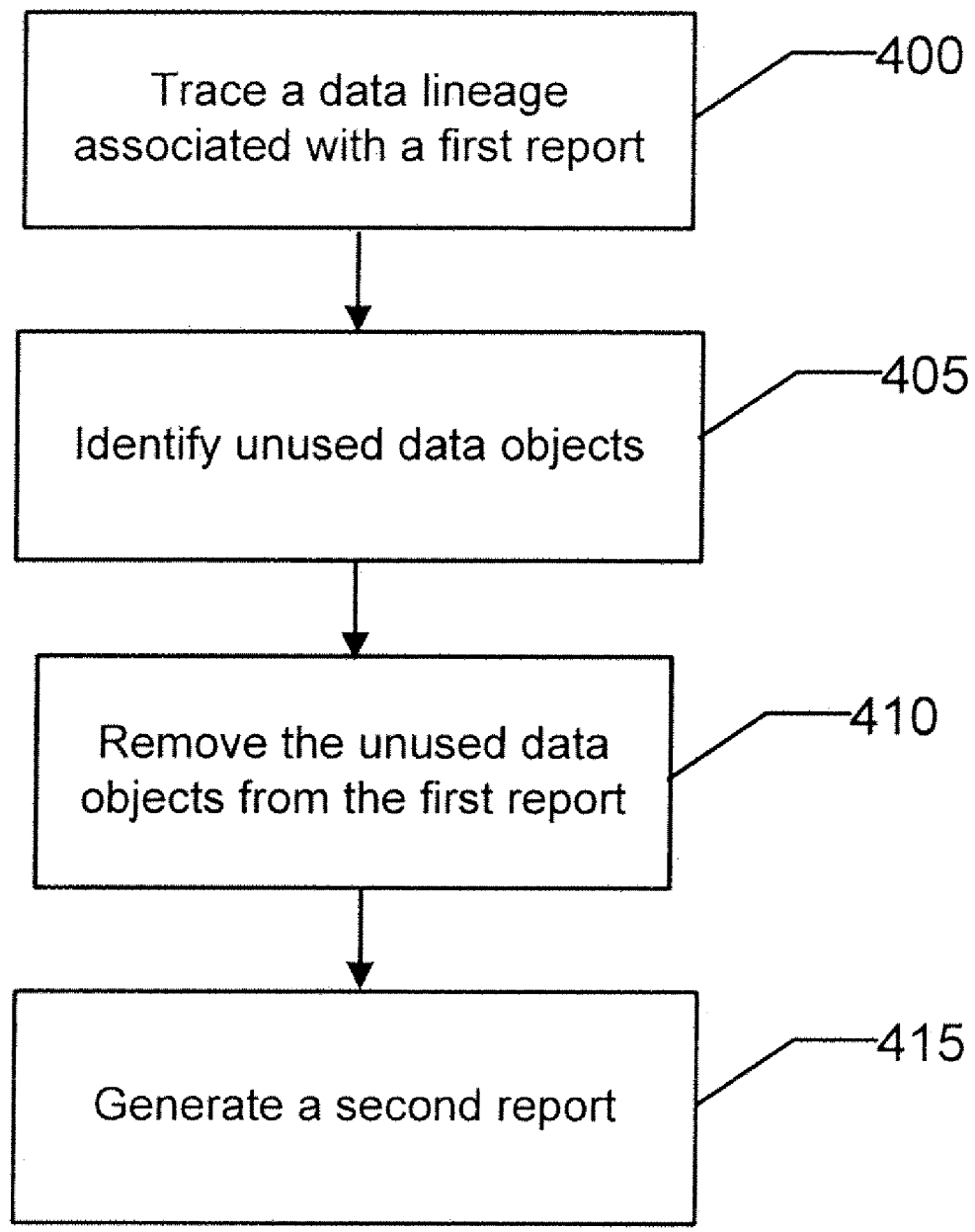
FIG. 4 illustrates a flow chart for removing references to unused data objects in a report based on the data lineage of the report according to an embodiment of the invention.

FIG. 4 illustrates a flow chart for removing references to unused data objects in a report based on the data lineage of the report according to an embodiment of the invention. First, the data lineage of the data objects associated with a first report is traced (400). The backward lineage of the metadata associated with the data objects is also traced. The data lineage and the backward lineage of the metadata are analyzed to identify any unused data objects (405). The unused data objects are removed from the data objects referenced in the first report to generate a subset of data objects containing only those data objects that are used to generate results for the first report (410).

In one embodiment, the unused data objects may be removed automatically according to a pre-determined condition. In another embodiment, the unused data objects may be displayed to a user and the user may select which unused data objects to remove from the first report. The unused data objects may be categorized by their types to make it easier for the user to select the objects to remove.

Lastly, a second report is generated defining a subset of references to the subset of data objects (415). The subset of references includes only references to those data objects in the subset of data objects. All references to unused data objects are removed. Memory resources allocated for the unused data objects are also freed up, thereby guaranteeing that the second report is smaller and less complex than the first report.

Figure 5:
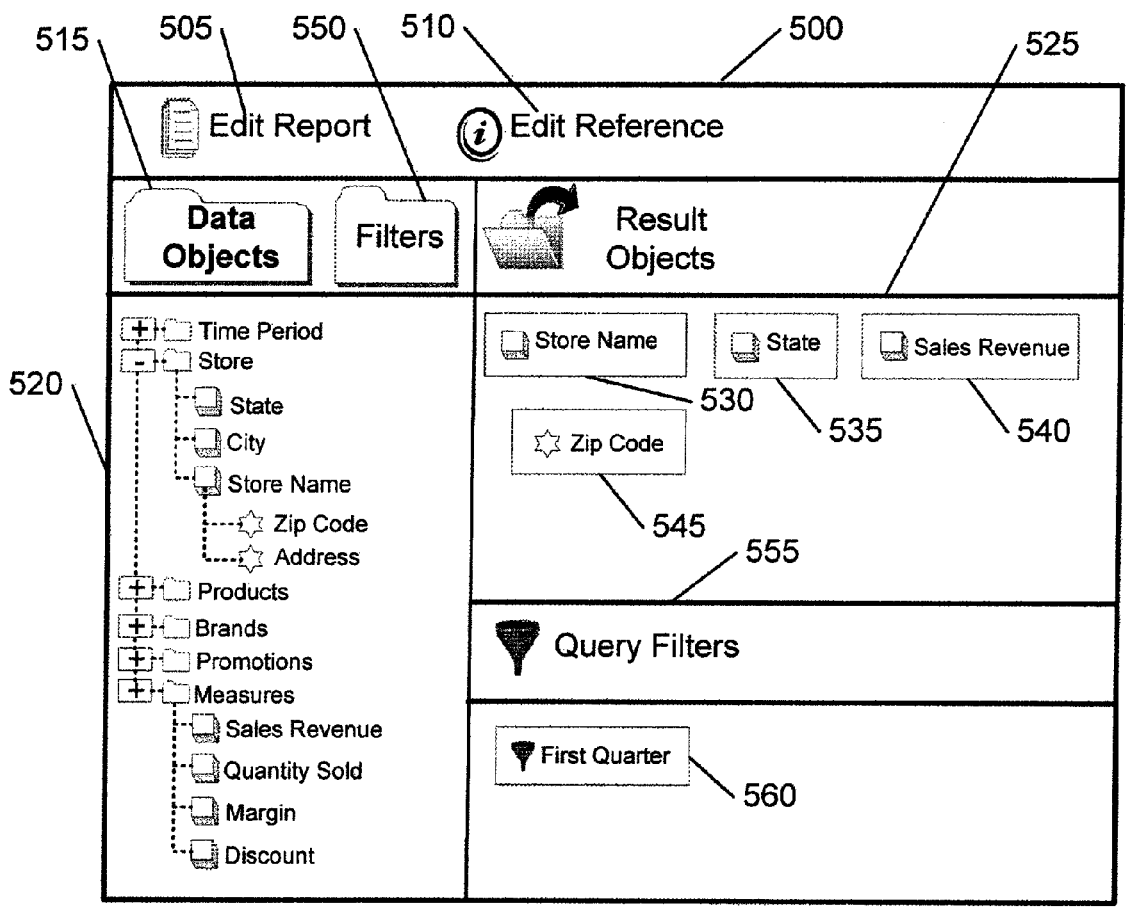
FIG. 5 illustrates an exemplary interface for use with a report engine to generate a report according to an embodiment of the invention.

Referring now to FIG. 5, an exemplary interface for use with a report engine to generate a report according to an embodiment of the invention is described. Interface 500 enables users to generate a report. Among various functions, interface 500 allows users to generate and edit a report in tab 505, edit references such as queries, formulas, etc., in tab 510, and select data objects in tab 515 to be included in the report.

By clicking tab 515, the user may visualize in window 520 the data objects that are available for inclusion in the report. In one embodiment, the user may drag and drop the selected data objects into Result Objects window 525, with tabs 530-545 representing the selected data objects. For example, tab 530 represents a Store Name data object, tab 535 represents a State data object, tab 540 represents a Sales Revenue data object, and tab 545 represents a Zip Code data object. These data objects may be selected, for example, to generate a report for a retail organization as described above.

Interface 500 also allows users to specify filters for the report in tab 550. For example, users may select filters to limit the scope of aggregations on selected data objects, to specify time periods, or to narrow down the range of calculations for the selected data objects. In the example illustrated in FIG. 5, a filter limiting the report results for the first quarter is selected and represented in Query Filters window 555 as tab 560.

After user selection of data objects 530-545 and filter 560, Report Engine 150 generates queries and other references (e.g., formulas, aggregations, etc.) for the report. The queries and references may also be edited by the user in tab 505. In addition, the user may also specify how the report results are to be formatted for presentation on a display screen.

According to an embodiment of the invention, results for the report may be generated without using all queries, references and data objects specified in the report. For example, the report may be defined such that results for the Sales Revenue data object 540 are to be computed for the first quarter according to filter 560 and displayed for the Store Name data object 530 and State data object 540. That is, the Zip Code data object 545 may not be used at all for generating the report results. References to the Zip Code data object 545, e.g., queries, may also not be necessary for generating the report results. Accordingly, the unused Zip Code data object 545 and its associated references are removed from the report and a new report without the unused data object and unused references is generated.

Figure 6:
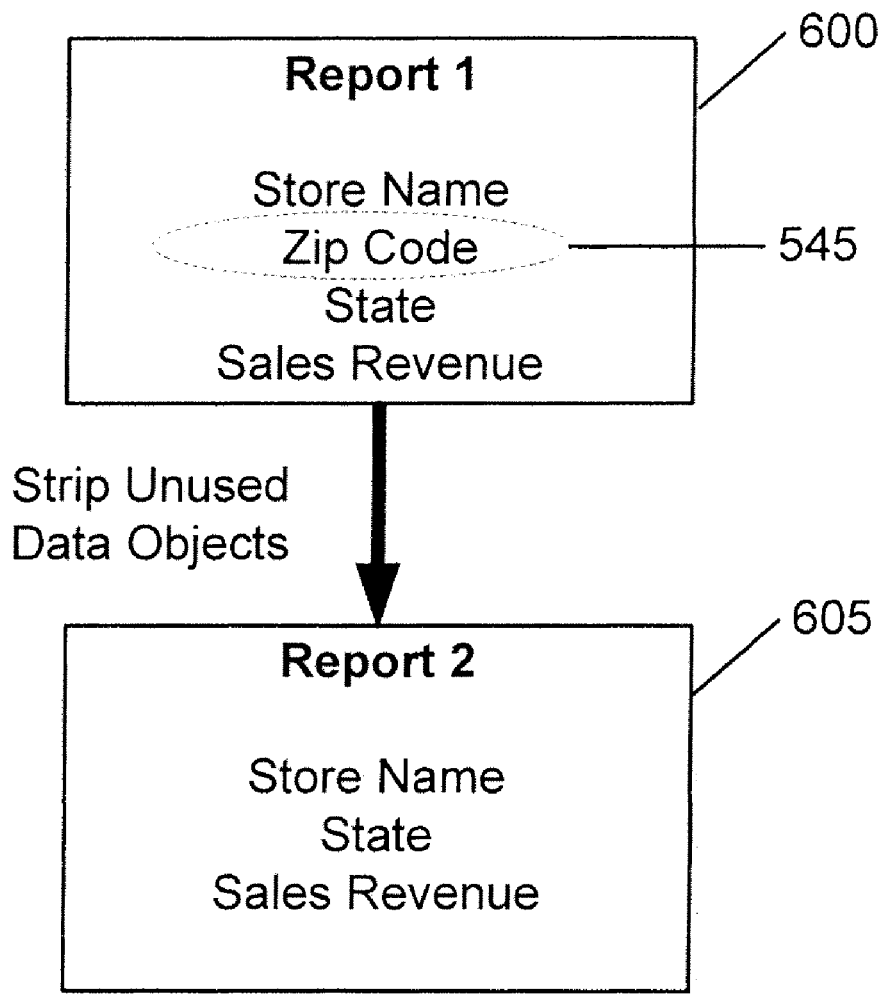
FIG. 6 illustrates a schematic diagram of an exemplary first report including a reference to an unused data object and an exemplary second report with the reference to the unused data object removed according to an embodiment of the invention.

Referring now to FIG. 6, a schematic diagram of an exemplary first report including a reference to an unused data object and an exemplary second report with the reference to the unused data object removed according to an embodiment of the invention is described. Report 600 illustrates a report generated with data objects 530-545 and filter 560 shown in interface 500. As discussed above, report 600 may be designed such that the Zip Code data object 545 is not used to generate the report results.

Accordingly, Report Engine 150 traces the data lineage of report 600 to identify that Zip Code data object 545 is an unused data object. Report Engine 150 then removes the unused Zip Code data object 545 and any unused references to data object 545 from report 600. As described above, this is accomplished by freeing up memory resources allocated to unused data object 545 and specifying new references to the other data objects in report 600 that are used in the generation of the report results.

In one embodiment, the unused data object 545 may be selected for removal by the user. Any unused data object may be displayed for the user to decide whether to remove it from the report. The displayed data objects may also be categorized by type. e.g., variables, measures, etc., to facilitate the user selection of which unused data objects to remove from report 600.

A new report 605 without the unused data object 545 and the unused references is generated by Report Engine 150. This new report 605 is smaller and less complex than report 600, making it easier for users to understand the structure of the report. Furthermore, because report 605 is smaller and less complex than the original report 600, the time to update its underlying data objects and queries is also reduced.

Figure 7:
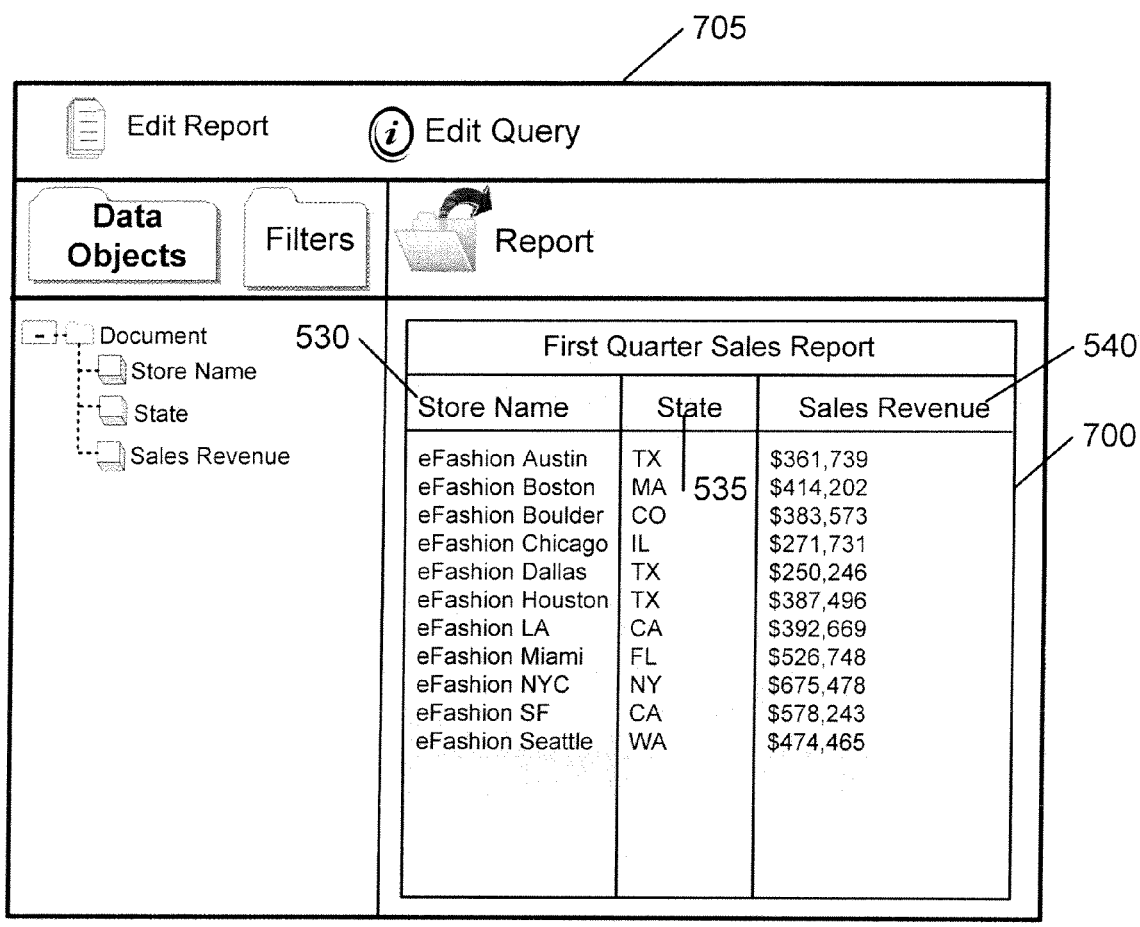
FIG. 7 illustrates exemplary report results generated with the interface of FIG. 5 according to an embodiment of the invention.

FIG. 7 illustrates exemplary report results generated with the interface of FIG. 5 according to an embodiment of the invention. Report results 700 displayed in interface screen 705 show Sales Revenue 540 for the first quarter by Store Name 530 and State 535. These results are generated for either report 600 or report 605. Report 605, however, as described above, is smaller and less complex than report 600 due to the removal of unused data objects and unused data object references.

Advantageously, the present invention optimizes report documents to include only references to data objects that are used to generate report results. Unused data objects and references thereto are removed from the report, thereby making it smaller and less complex. The report refresh time is also reduced. By stripping the report of unused data objects and references thereto, users can gain a better understanding of the report structure and the underlying data objects.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed, obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A computer readable storage medium, comprising executable instructions to:

provide a first report defining a plurality of references to a plurality of data objects, wherein the first report includes information automatically retrieved from a data source, where the information is structured in accordance with a report schema that specifies the form in which the information should be presented, and wherein the plurality of data objects describe the data source and define dimensions, attributes and measures applied to the data source;

analyze the plurality of references to the plurality of data objects to identify references to unused data objects;

remove the references to the unused data objects from the plurality of references to generate a subset of references to a subset of data objects; and generate a second report defining the subset of references to the subset of data objects.

2. The computer readable storage medium of claim 1, wherein the subset of data objects comprises the plurality of data objects minus the unused data objects.

3. The computer readable storage medium of claim 2, wherein the executable instructions to analyze the plurality of references comprise executable instructions to trace a data lineage of the plurality of data objects.

4. The computer readable storage medium of claim 3, wherein the executable instructions to trace the data lineage of the plurality of data objects comprise executable instructions to identify the subset of data objects in the plurality of data objects that are used to generate results for the first report.

5. The computer readable storage medium of claim 4, further comprising executable instructions to remove the unused data objects from the plurality of data objects to form the subset of data objects, the unused data objects matching a pre-determined condition.

6. The computer readable storage medium of claim 4, further comprising executable instructions to enable a user to select the unused data objects for removal from the plurality of data objects to form the subset of data objects.

7. The computer readable storage medium of claim 6, further comprising executable instructions to free memory resources allocated by the unused data objects.

8. The computer readable storage medium of claim 7, wherein the subset of references is used to generate results for the second report.

9. The computer readable storage medium of claim 8, further comprising executable instructions to trace a backward lineage for metadata associated with the plurality of data objects.

10. The computer readable storage medium of claim 1, wherein the plurality of references comprises references selected from the list comprising: queries, formulas, aggregations, functions, and operators.

11. A computer readable storage medium, comprising executable instructions to:

trace a data lineage of a plurality of data objects associated with a first report, wherein the first report includes information automatically retrieved from a data source, where the information is structured in accordance with a report schema that specifies the form in which the information should be presented, and wherein the plurality of data objects describe the data source and define dimensions, attributes and measures applied to the data source;

analyze the data lineage to identify unused data objects in the plurality of data objects;

remove the unused data objects from the plurality of data objects to generate a subset of data objects; and generate a second report defining a subset of references to the subset of data objects.

12. The computer readable storage medium of claim 11, wherein the first report comprises a plurality of references to the plurality of data objects.

13. The computer readable storage medium of claim 12, wherein the executable instructions to analyze the data lineage comprise executable instructions to identify a set of references in the plurality of references that retrieves the unused data objects from the data source.

14. The computer readable storage medium of claim 13, further comprising executable instructions to remove the set of references from the plurality of references to generate the subset of references.

15. The computer readable storage medium of claim 14 further comprising executable instructions to trace a backward lineage for metadata associated with the plurality of data objects.

16. The computer readable storage medium of claim 15, further comprising executable instructions to receive a selection of the unused data objects to remove from the plurality of data objects.

17. A method for stripping a document of references to unused data objects, comprising:

providing a first report defining a plurality of references to a plurality of data objects, wherein the first report includes information automatically retrieved from a data source, where the information is structured in accordance with a report schema that specifies the form in which the information should be presented, and wherein the plurality of data objects describe the data source and define dimensions, attributes and measures applied to the data source;

analyzing the plurality of references to the plurality of data objects to determine a first subset of references to a first subset of data objects, the first subset of data objects comprising unused data objects; and generating a second report defining a second subset of references to a second subset of data objects, the second subset of data objects comprising the plurality of data objects minus the unused data objects.

18. The method of claim 17, further comprising tracing a data lineage of the plurality of data objects.

19. The method of claim 18, further comprising using the data lineage to identify the first subset of references in the plurality of references that retrieves unused data objects from the data source.

20. The method of claim 19, further comprising removing the first subset of references from the plurality of references to generate the second subset of references.

21. The method of claim 20, further comprising removing the unused data objects from the plurality of data objects to form the second subset of data objects.

22. The method of claim 21, further comprising displaying the unused data objects to a user.

23. The method of claim 22, further comprising allowing the user to select the unused data objects to remove from the plurality of data objects to form the subset of data objects.

24. The method of claim 23, further comprising categorizing the unused data objects by type to allow the user to select the unused data objects.

25. The method of claim 24, further comprising automatically removing the unused data objects from the plurality of data objects to form the subset of data objects, the unused data objects matching a pre-determined condition.

* * * * *